US012621090B2

(12) United States Patent
Sun et al.

(10) Patent No.: US 12,621,090 B2
(45) Date of Patent: May 5, 2026

(54) PHYSICAL LAYER DESIGNS FOR CARRIER AGGREGATION-BASED RADIO UNIT SHARING

(71) Applicant: QUALCOMM Incorporated, San Diego, CA (US)

(72) Inventors: Jing Sun, San Diego, CA (US); Aleksandar Damnjanovic, Del Mar, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 817 days.

(21) Appl. No.: 17/954,256

(22) Filed: Sep. 27, 2022

(65) Prior Publication Data

US 2024/0106583 A1     Mar. 28, 2024

(51) Int. Cl.
H04L 5/00 (2006.01)

(52) U.S. Cl.
CPC .......... H04L 5/0005 (2013.01); H04L 5/0044 (2013.01); H04L 5/0092 (2013.01)

(58) Field of Classification Search
CPC ... H04L 5/0005; H04L 5/0044; H04L 5/0092; H04L 5/001
See application file for complete search history.

(56) References Cited

U.S. PATENT DOCUMENTS

| | | | | |
|---|---|---|---|---|
| 11,737,105 | B2 * | 8/2023 | Luo | H04L 5/0087 |
| | | | | 370/329 |
| 12,356,390 | B2 * | 7/2025 | Zhang | H04W 72/12 |
| 2012/0028664 | A1 * | 2/2012 | Zhang | H04W 16/14 |
| | | | | 455/501 |
| 2012/0120887 | A1 * | 5/2012 | Deaton | H04W 16/14 |
| | | | | 370/329 |

(Continued)

OTHER PUBLICATIONS

R. Umar, A. U. H. Sheikh, M. Deriche, M. Shoaib and M. Hadi, "Multi-operator spectrum sharing in next generation wireless communications networks: A short review and roadmap to future," 2017 International Symposium on Wireless Systems and Networks (ISWSN), Lahore, Pakistan, 2017, pp. 1-5, (Year: 2017).*

(Continued)

*Primary Examiner* — Phirin Sam
*Assistant Examiner* — Tarell A Hampton
(74) *Attorney, Agent, or Firm* — Holland & Hart LLP

(57) ABSTRACT

Methods, systems, and devices for wireless communications are described. In wireless communications, operators may coordinate resource sharing over respective carriers. A user interface may receive, by a first network entity associated with a first carrier from a second network entity associated with a second carrier, an indication of a first set of time intervals when the second carrier is available for communications from the first network entity. The first network entity may be associated with a first operator and the second network entity may be associated with a second operator. Both the first network entity and the second network entity (Continued)

Receive, by a first network entity associated with a first carrier from a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit — 1205

Transmit, based at least in part on receiving the indication, control signaling indicating a carrier aggregation mode associated with the first carrier and the second carrier for one or more user equipments (UE) — 1210

Communicate, via the radio unit, with the one or more UEs during the first set of time intervals via the first carrier and the second carrier according to indication of [] the carrier aggregation mode — 1215

— 1200 may be coupled to a single radio unit. The first network entity may transmit based on receiving the indication, control signaling indicating a carrier aggregation mode associated with the first carrier and the second carrier for one or more user equipment.

28 Claims, 13 Drawing Sheets

(56)　　　　　　　References Cited

U.S. PATENT DOCUMENTS

| | | | | |
|---|---|---|---|---|
| 2013/0279376 | A1* | 10/2013 | Ahmadi | H04W 72/04 |
| | | | | 370/329 |
| 2014/0206377 | A1* | 7/2014 | Priotti | H04W 72/52 |
| | | | | 455/454 |
| 2015/0092758 | A1* | 4/2015 | Chen | H04W 84/12 |
| | | | | 370/336 |
| 2015/0119064 | A1* | 4/2015 | Takano | H04W 16/14 |
| | | | | 455/454 |
| 2015/0281974 | A1* | 10/2015 | Ghasemzadeh ... | H04W 72/0453 |
| | | | | 455/454 |
| 2016/0353422 | A1* | 12/2016 | Vrzic | H04W 16/02 |
| 2018/0013594 | A1* | 1/2018 | Mukkavilli | H04L 5/14 |
| 2018/0092081 | A1* | 3/2018 | Chen | H04W 72/20 |
| 2018/0115906 | A1* | 4/2018 | Damnjanovic ... | H04W 72/1215 |
| 2018/0115907 | A1* | 4/2018 | Damnjanovic ... | H04W 72/1215 |
| 2019/0007899 | A1* | 1/2019 | Vrzic | H04W 8/02 |
| 2020/0015268 | A1* | 1/2020 | Zhang | H04W 74/0808 |
| 2020/0145991 | A1* | 5/2020 | Abedini | H04B 7/15542 |
| 2020/0359402 | A1* | 11/2020 | Xing | H04W 72/0453 |
| 2021/0176746 | A1* | 6/2021 | Abedini | H04W 28/18 |
| 2021/0378011 | A1* | 12/2021 | Luo | H04W 72/23 |
| 2022/0150894 | A1* | 5/2022 | Furuichi | H04W 16/14 |
| 2022/0394488 | A1* | 12/2022 | Navarro | H04W 16/10 |
| 2023/0134743 | A1* | 5/2023 | Åström | H04L 5/0035 |
| | | | | 370/329 |
| 2023/0284032 | A1* | 9/2023 | Kim | H04W 16/14 |
| | | | | 370/329 |

OTHER PUBLICATIONS

L. Anchora, L. Badia, E. Karipidis and M. Zorzi, "Capacity gains due to orthogonal spectrum sharing in multi-operator LTE cellular networks," 2012 International Symposium on Wireless Communication Systems (ISWCS), Paris, France, 2012, pp. 286-290, (Year: 2012).*

* cited by examiner

810

820

815

805

800

130

105

115

Network
Entity

Transceiver

1110

Antenna

1115

Communications
Manager

1120

Memory

Code

1130

1125

1140

Processor

1135

1105

1100

Figure 12:
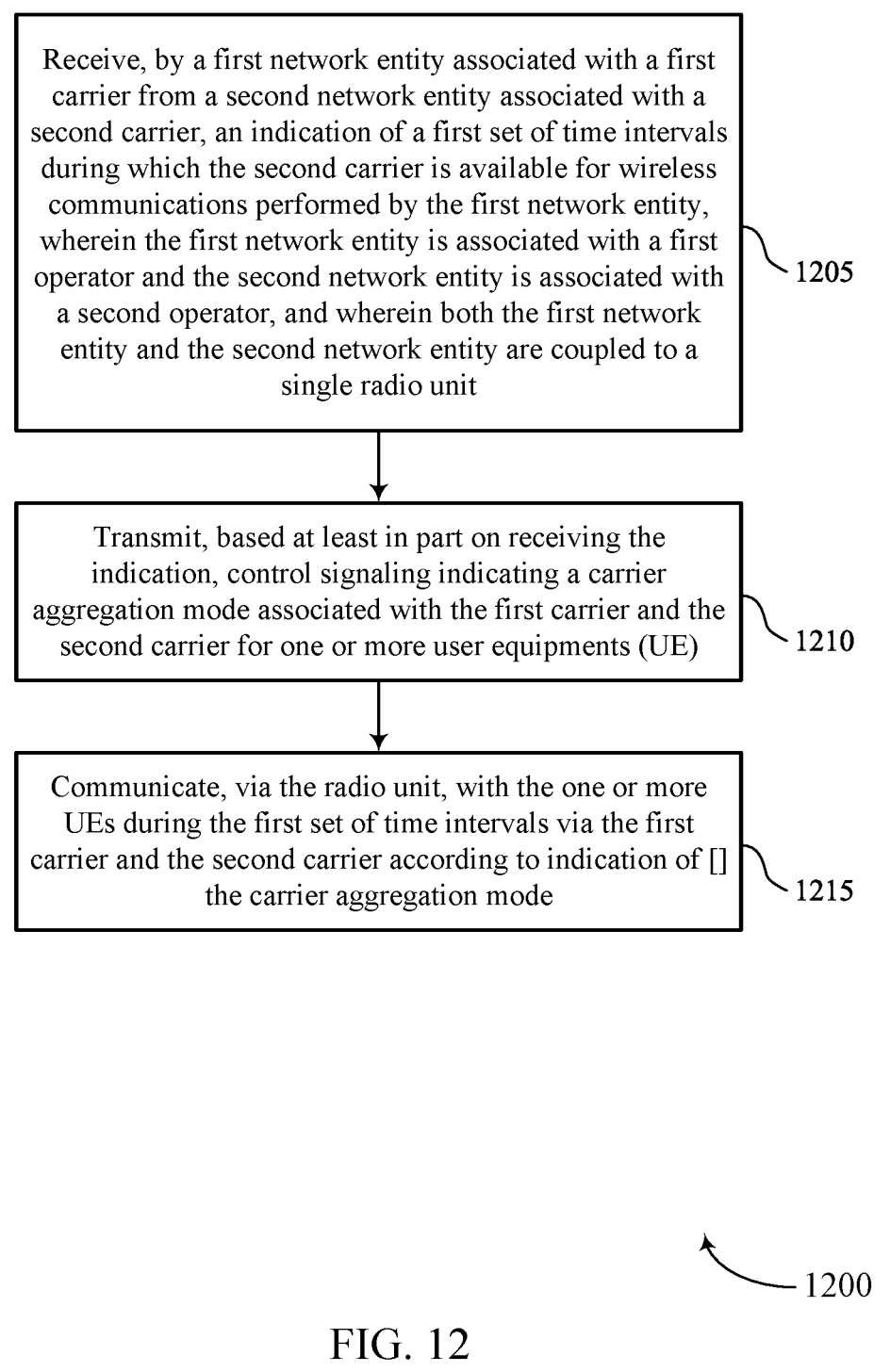

Receive, by a first network entity associated with a first carrier from a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit

1205

Transmit, based at least in part on receiving the indication, control signaling indicating a carrier aggregation mode associated with the first carrier and the second carrier for one or more user equipments (UE)

1210

Communicate, via the radio unit, with the one or more UEs during the first set of time intervals via the first carrier and the second carrier according to indication of [] the carrier aggregation mode

Figure 13:
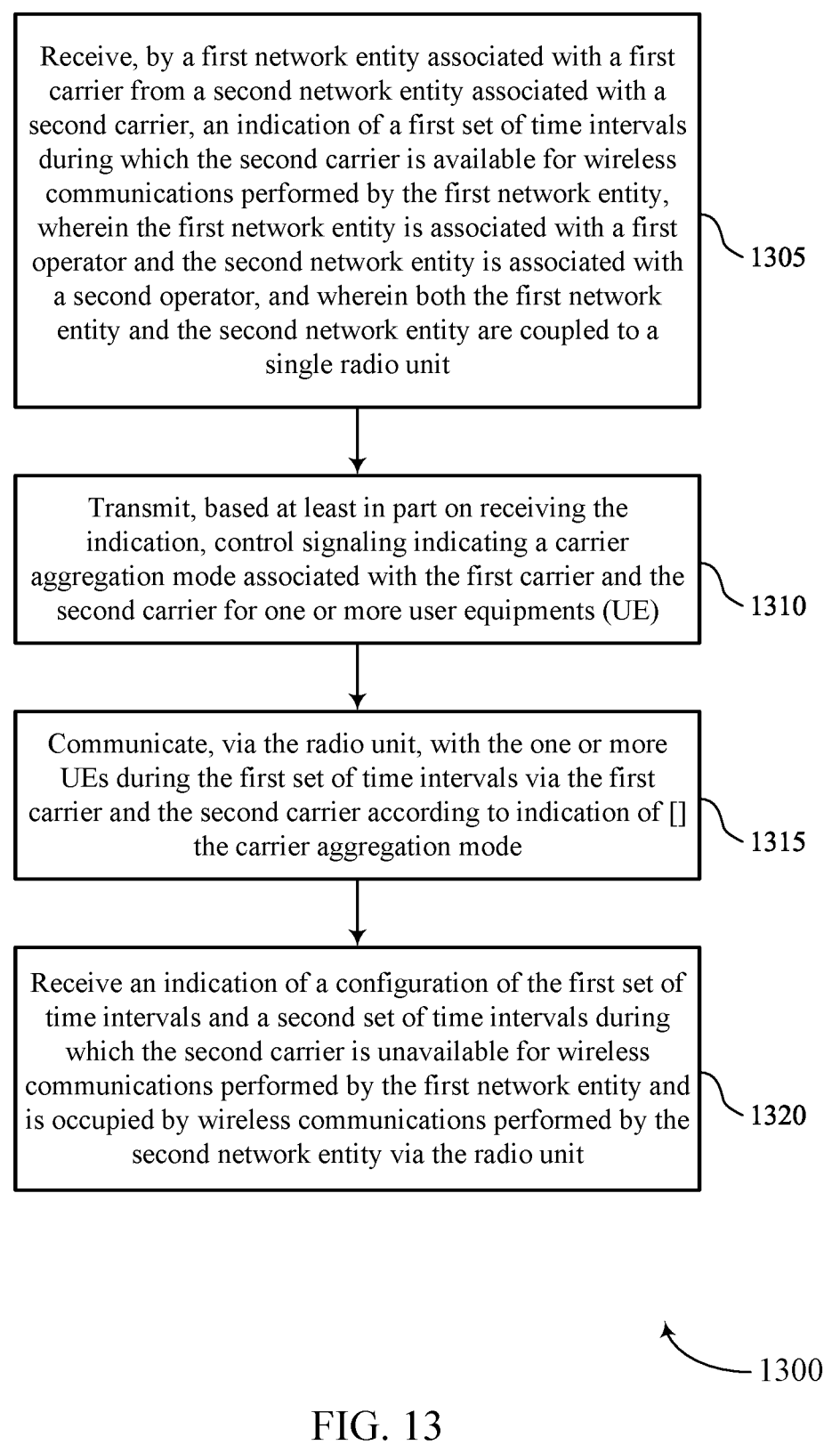

Receive, by a first network entity associated with a first carrier from a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit

1305

Transmit, based at least in part on receiving the indication, control signaling indicating a carrier aggregation mode associated with the first carrier and the second carrier for one or more user equipments (UE)

1310

Communicate, via the radio unit, with the one or more UEs during the first set of time intervals via the first carrier and the second carrier according to indication of [] the carrier aggregation mode

1315

Receive an indication of a configuration of the first set of time intervals and a second set of time intervals during which the second carrier is unavailable for wireless communications performed by the first network entity and is occupied by wireless communications performed by the second network entity via the radio unit

PHYSICAL LAYER DESIGNS FOR CARRIER AGGREGATION-BASED RADIO UNIT SHARING

FIELD OF TECHNOLOGY

The following relates to wireless communications, including physical layer designs for carrier aggregation-based radio unit (RU) sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support physical layer designs for carrier aggregation-based radio unit (RU) sharing. Multiple operators may use individual RUs to serve the same area. This may result in multiple operators expending significant deployment and operational costs to serve user equipments (UEs) in the same or overlapping coverage areas. The described techniques provide for the multiple operators that are associated with different entities to coordinate sharing of their carriers. By way of example, a first operator may share a time (e.g., time slot or duration) in which it is not using its carrier so that a second operator may utilize the available carrier. In this manner, coordination between operators may facilitate efficient use of resources, such as use of carriers associated with various operators via a single RU. The operators may coordinate use of their carriers according to a semi-static configuration where a time domain pattern is pre-negotiated between operators for carrier usage. Additionally or alternatively, operators may coordinate use of their carriers according to a dynamic configuration where the owning operator may dynamically indicate if a resource is shareable, for example, by delaying the decision to share or not share the resource.

A method is described. The method may include receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU, transmitting, based on receiving the indication, control signaling indicating a carrier aggregation mode associated with the first carrier and the second carrier for one or more UEs, and communicating, via the RU, with the one or more UEs during the first set of time intervals via the first carrier and the second carrier according to the indication of the carrier aggregation mode.

An apparatus is described. The apparatus may include a processor, memory coupled with the processor, and instructions stored in the memory. The instructions may be executable by the processor to cause the apparatus to receive, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU, transmit, based on receiving the indication, control signaling indicating a carrier aggregation mode associated with the first carrier and the second carrier for one or more UEs, and communicate, via the RU, with the one or more UEs during the first set of time intervals via the first carrier and the second carrier according to the indication of the carrier aggregation mode.

Another apparatus is described. The apparatus may include means for receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU, means for transmitting, based on receiving the indication, control signaling indicating a carrier aggregation mode associated with the first carrier and the second carrier for one or more UEs, and means for communicating, via the RU, with the one or more UEs during the first set of time intervals via the first carrier and the second carrier according to the indication of the carrier aggregation mode.

A non-transitory computer-readable medium storing code is described. The code may include instructions executable by a processor to receive, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU, transmit, based on receiving the indication, control signaling indicating a carrier aggregation mode associated with the first carrier and the second carrier for one or more UEs, and communicate, via the RU, with the one or more UEs during the first set of time intervals via the first carrier and the second carrier according to the indication of the carrier aggregation mode.

In some examples of the method, apparatuses, and non-transitory computer-readable medium described herein, receiving the indication may include operations, features, means, or instructions for receiving an indication of a configuration of the first set of time intervals and a second set of time intervals during which the second carrier may be unavailable for wireless communications performed by the first network entity and may be occupied by wireless communications performed by the second network entity via the RU.

In some examples of the method, apparatuses, and non-transitory computer-readable medium described herein, the configuration further indicates that the first carrier may be available for wireless communications performed by the second network entity via the RU during one or more time intervals of the second set of time intervals.

Some examples of the method, apparatuses, and non-transitory computer-readable medium described herein may further include operations, features, means, or instructions for transmitting a coordination message indicating an availability of the first carrier for the wireless communications performed by the second network entity via the RU during the second set of time intervals, where receiving the indication of the configuration may be based on the coordination message.

In some examples of the method, apparatuses, and non-transitory computer-readable medium described herein, receiving the indication may include operations, features, means, or instructions for receiving an indication of the first set of time intervals, a second set of time intervals during which the second carrier may be unavailable for wireless communications performed by the first network entity and may be occupied by wireless communications performed by the second network entity via the RU, and a shared third set of time intervals during which the second carrier may be available for wireless communications performed by the first network entity or the second network entity.

Some examples of the method, apparatuses, and non-transitory computer-readable medium described herein may further include operations, features, means, or instructions for transmitting, to the second network entity at least a threshold amount of time prior to a first time interval of the shared third set of time intervals, a resource sharing message indicating the first time interval of the shared third set of time intervals and communicating, via the first carrier and the second carrier and based on the resource sharing message, with the one or more UEs during the first time interval of the shared third set of time intervals.

Some examples of the method, apparatuses, and non-transitory computer-readable medium described herein may further include operations, features, means, or instructions for receiving, from the second network entity at least a threshold amount of time prior to a first time interval of the shared third set of time intervals, a resource sharing message indicating the first time interval of the shared third set of time intervals and refraining from communicating with the one or more UEs via the first carrier and the second carrier during the first time interval of the shared third set of time intervals based on receiving the resource sharing message.

Some examples of the method, apparatuses, and non-transitory computer-readable medium described herein may further include operations, features, means, or instructions for receiving, from the second network entity, an indication of transmission parameters for common signaling associated with the first operator and the second operator and transmitting, during the first set of time intervals, the common signaling according to the transmission parameters.

In some examples of the method, apparatuses, and non-transitory computer-readable medium described herein, the common signaling includes synchronization signals, channel state information reference signals, or a combination thereof.

Some examples of the method, apparatuses, and non-transitory computer-readable medium described herein may further include operations, features, means, or instructions for receiving, from the second network entity, an indication of first subset of frequency resources of the first carrier reserved for transmitting common signaling associated with the second operator and refraining from communicating with the one or more UEs via the first subset of frequency resources during the first set of time intervals.

Some examples of the method, apparatuses, and non-transitory computer-readable medium described herein may further include operations, features, means, or instructions for transmitting, to the second network entity, an indication of a second subset of frequency resources of the second carrier reserved for common signaling associated with the first operator and transmitting the common signaling via the second subset of frequency resources of the first carrier during a second set of time intervals during which the second carrier may be otherwise unavailable for wireless communications performed by the first network entity.

In some examples of the method, apparatuses, and non-transitory computer-readable medium described herein, the common signaling includes synchronization signals, channel state information reference signals, system information, automatic neighbor relation information, or any combination thereof.

In some examples of the method, apparatuses, and non-transitory computer-readable medium described herein, receiving the indication may include operations, features, means, or instructions for receiving the indication via a CU of the first network entity or a DU of the first network entity from a CU of the second network entity or a DU of the second network entity.

In some examples of the method, apparatuses, and non-transitory computer-readable medium described herein, receiving the indication may include operations, features, means, or instructions for receiving the indication via a third network entity relaying the indication from the second network entity.

In some examples of the method, apparatuses, and non-transitory computer-readable medium described herein, communicating with the one or more UEs may include operations, features, means, or instructions for transmitting control signaling via the first carrier, the first carrier including a primary cell of the carrier aggregation mode and transmitting data signaling, common signaling, or both, via the second carrier, the second carrier including a secondary cell of the carrier aggregation mode.

BRIEF DESCRIPTION OF THE DRAWINGS

FIGS. 12 and 13 show flowcharts illustrating methods that support physical layer designs for carrier aggregation-based RU sharing in accordance with one or more aspects of the present disclosure.

DETAILED DESCRIPTION

To efficiently utilize available system resources, multiple operators may use radio units (RUs) to serve the same area. This may result in multiple operators expending significant deployment and operational costs to serve user equipments (UEs) in the same or overlapping coverage areas. To save on deployment and operational costs, a single RU may be shared by multiple operators. However, without a mechanism for coordination between operators, operators may not be able to effectively utilize available system resources via a single RU.

Techniques described herein relate to coordinating sharing of carrier information between operators. Two network entities associated with different operators may each own (e.g., have spectrum rights to) a carrier, and these operators may coordinate sharing of their carriers. That is, during some time intervals, a first operator may serve one or more UEs using both carriers, and during other time intervals, a second operator may serve one or more UEs using both carriers. The operators may coordinate use of their carriers according to a semi-static coordination, where a time domain pattern applied to carrier usage is pre-negotiated between operators. Additionally or alternatively, the operators may coordinate use of their carriers according to a dynamic coordination, where carrier usage is negotiated dynamically and allows the owning operator (e.g., owning a carrier) to make the decision to share or not share with the other operator (e.g., non-owning operator) at a dynamic level.

Additionally, common signaling may be supported by carrier aggregation-based RU sharing. In some examples, the second operator may indicate to the first operator transmission parameters for common signaling, and the second operator may transmit the common signaling during the time intervals owned by the second operator. In some examples, each operator may long-term lease some resources of a carrier, such that even when that carrier is used by the other operator, the owning operator can still transmit common signaling.

Aspects of the disclosure are initially described in the context of wireless communications systems. Aspects of the disclosure are further illustrated by and described with reference to network architectures, wireless communications systems, timelines, and process flows. Aspects of the disclosure are further illustrated by and described with reference to apparatus diagrams, system diagrams, and flowcharts that relate to physical layer designs for carrier aggregation-based RU sharing.

Figure 1:
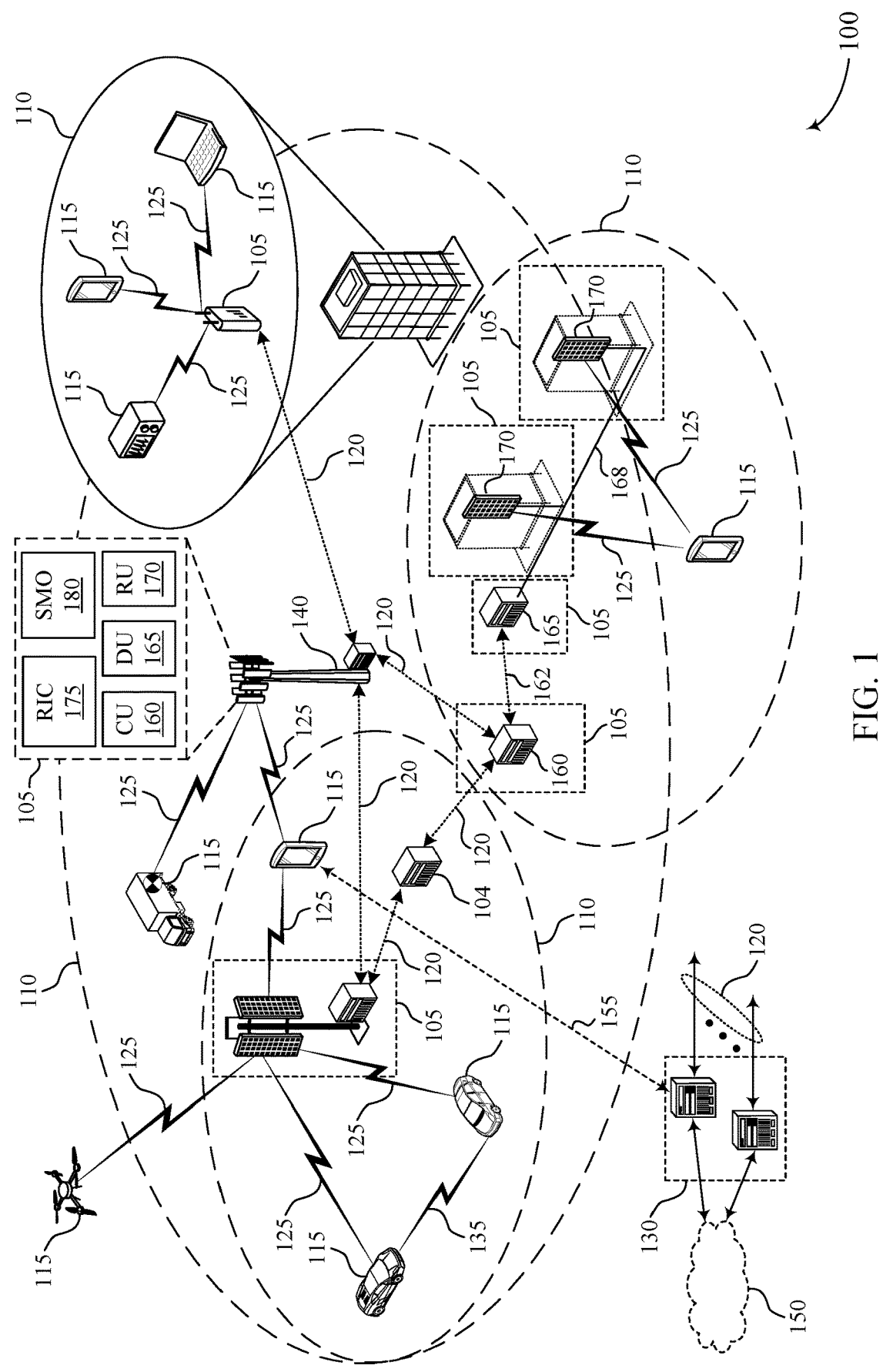
FIG. 1 illustrates an example of a wireless communications system that supports physical layer designs for carrier aggregation-based RU (RU) sharing in accordance with one or more aspects of the present disclosure.

FIG. 1 illustrates an example of a wireless communications system 100 that supports physical layer designs for carrier aggregation-based RU sharing in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a RU 170, a RAN Intelligent Controller (MC) 175 (e.g., a Near-Real Time MC (Near-RT RIC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104. In the case of the techniques described herein applied in the context of a disaggregated RAN architecture, one or more components of the disaggregated RAN architecture may be configured to support physical layer designs for carrier aggregation-based RU sharing as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $\Delta_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

To efficiently utilize available system resources in the wireless communication system 100, multiple operators may use RUs 170 to serve the same area. To save on deployment and operational costs associated with building multiple RUs 170, a single RU 170 may be shared by multiple operators. However, without a mechanism for coordination between operators, operators may not be able to effectively utilize available system resources via a single RU 170, such as the carriers associated with the operators.

By way of example, two network entities may be associated with a first operator and a second operator, respectively. The operators may each own (e.g., have spectrum rights to) a carrier. The operators may coordinate sharing of their carriers, such that during some time intervals, one operator may serve one or more UEs 115 using both carriers, and during other time intervals, the second operator may serve one or more UEs 115 using both carriers. The operators may coordinate use of their carriers according to a semi-static coordination, in which a time domain pattern is pre-negotiated between operators on carrier usage. The operators may coordinate use of their carriers according to a dynamic coordination, in which the time domain is negotiated dynamically and where the owning operator may make the decision to share or not to share at a dynamic level (e.g., frame level, slot level, symbol level).

Common signaling may be supported by the sharing scheme. In some examples, the second operator may indicate to the first operator transmission parameters for common signaling, and the second operator may transmit the common signaling during its time intervals. In some examples, each operator may long-term lease some resources of a carrier, such that even when that carrier is leased to the other operator, the owning operator can still transmit common signaling.

Figure 2:
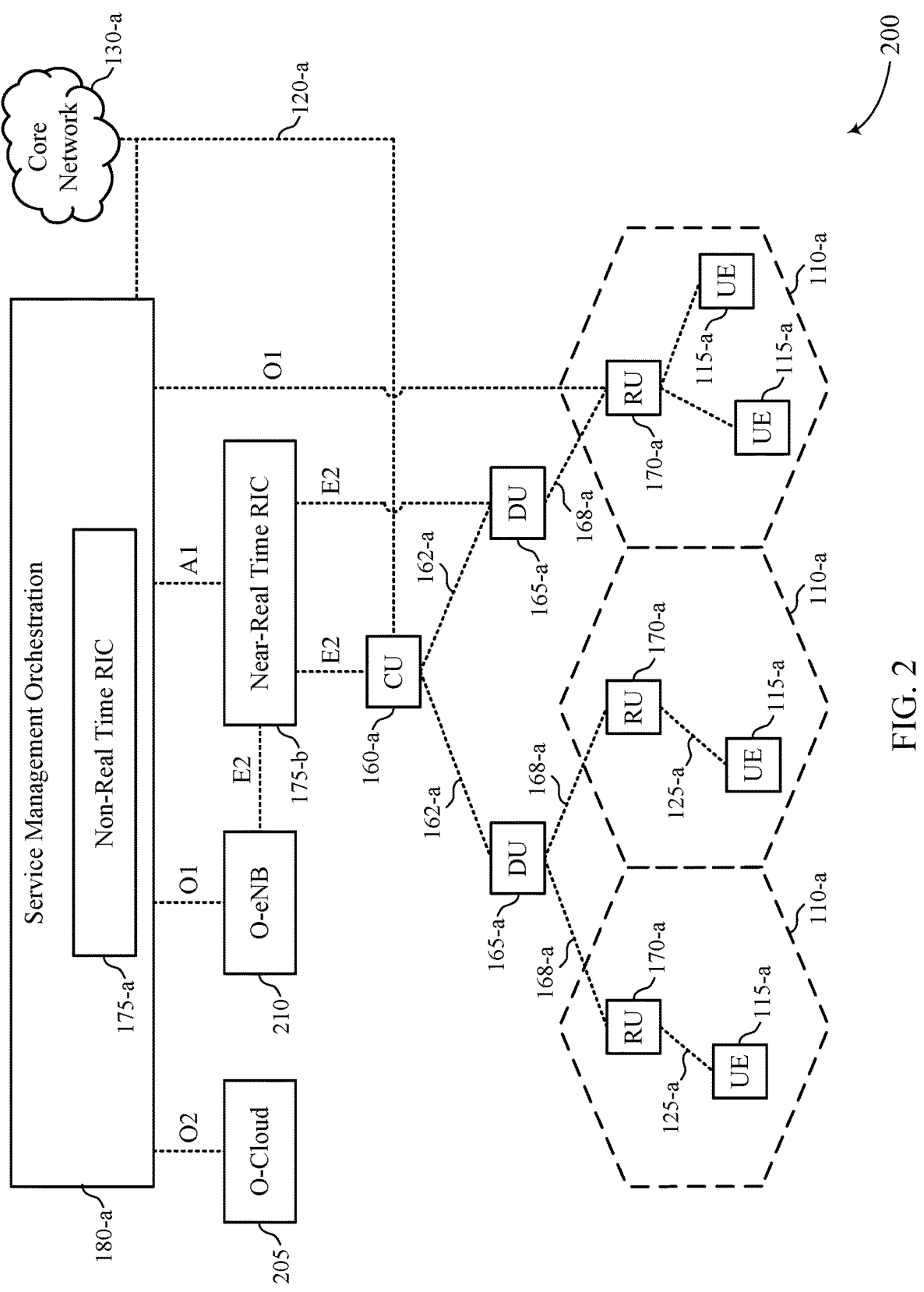
FIG. 2 illustrates an example of a network architecture that supports physical layer designs for carrier aggregation-based RU sharing in accordance with one or more aspects of the present disclosure.

FIG. 2 illustrates an example of a network architecture 200 (e.g., a disaggregated base station architecture, a disaggregated RAN architecture) that supports physical layer designs for carrier aggregation-based RU sharing in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

To efficiently utilize available system resources in the network architecture 200, multiple operators may use RUs 170 to serve the same area. To save on deployment and operational costs associated with building multiple RUs 170, a single RU 170 may be shared by multiple operators. However, without a mechanism for coordination between operators, operators may not be able to effectively utilize available system resources via a single RU 170, such as the carriers associated with the operators.

By way of example, two network entities may be associated with a first operator and a second operator, respectively. The operators may each own a carrier. The operators may coordinate sharing of their carriers, such that during some time intervals, one operator may serve one or more UEs 115 using both carriers, and during other time intervals, the second operator may serve one or more UEs 115 using both carriers. The operators may coordinate use of their carriers according to a semi-static coordination, in which a time domain pattern is pre-negotiated between operators on carrier usage. The operators may coordinate use of their carriers according to a dynamic coordination, in which the time domain is negotiated dynamically and where the owning operator may delay the decision to share or not to share at a dynamic level.

Common signaling may be supported by the sharing scheme. In some examples, the second operator may indicate to the first operator transmission parameters for common signaling, and the second operator may transmit the common signaling during its time intervals. In some examples, each operator may long-term lease some resources of a carrier, such that even when that carrier is leased to the other operator, the owning operator can still transmit common signaling.

Figure 3:
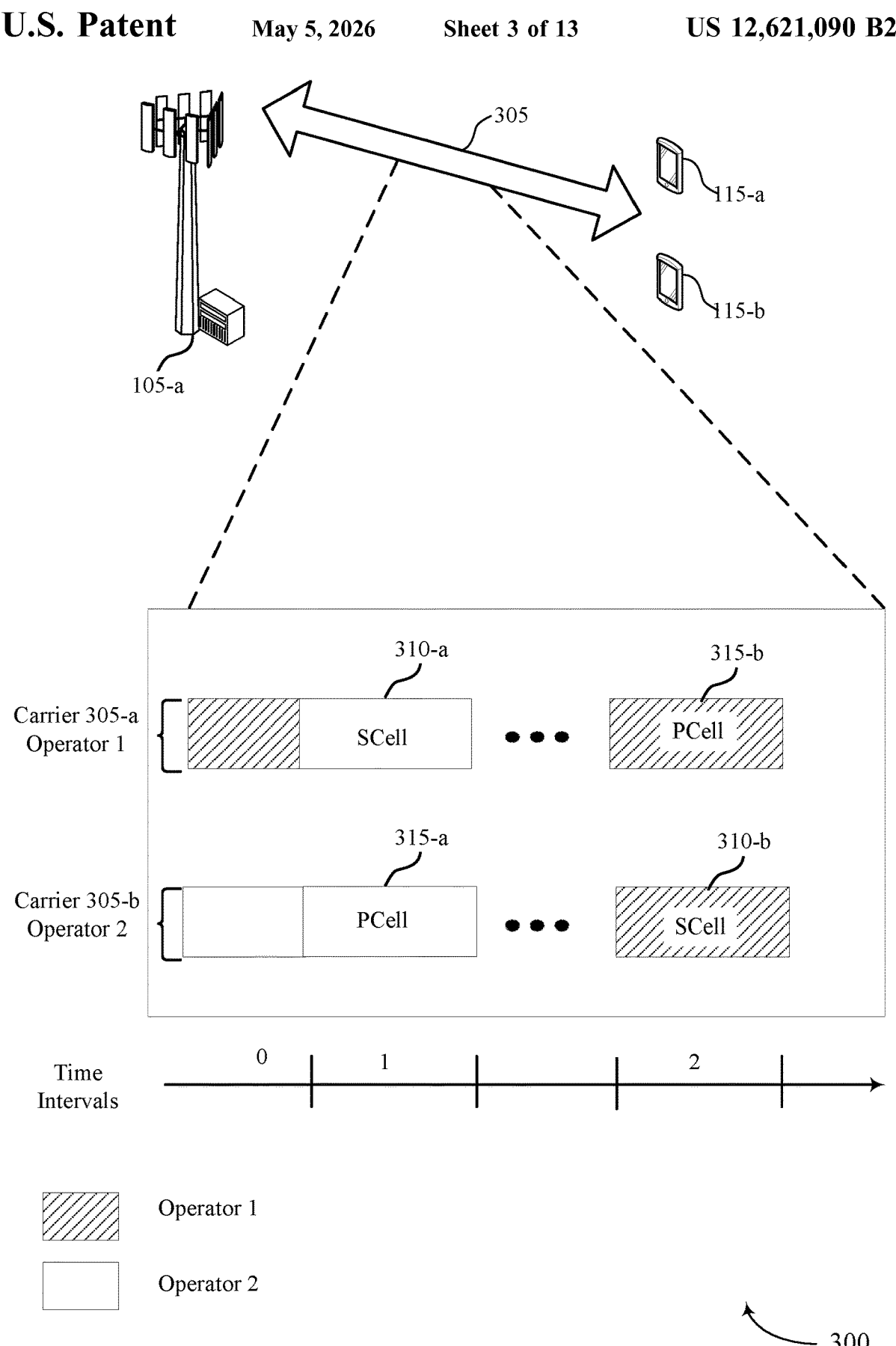
FIG. 3 illustrates an example of a wireless communication system utilizing the carrier aggregation-based RU sharing in accordance with one or more aspects of the present disclosure.

FIG. 3 illustrates an example of a wireless communication system 300 utilizing the carrier aggregation-based RU sharing in accordance with one or more aspects of the present disclosure. The wireless communications system 300 may implement, or be implemented by, aspects of the wireless communications system 100 or the network architecture 200. For example, the wireless communications system 200 may include a network entity 105-*a*, and one or more UEs 115 (e.g., the UE 115-*a* and the UE 115-*b*), which may be examples of corresponding devices described with reference to FIGS. 1-2. One or more network entities 105 (e.g., the network entity 105-*a*) may communicate with one or more UEs 115 via a shared RU 170.

As previously discussed, multiple operators, such as a first operator (operator 1) and a second operator (operator 2), may send communication signals via one or more carriers 305, such as a first carrier 305-*a* (e.g., a first frequency range) to service one or more UEs 115 (e.g., a first UE 115-*a*) and a second carrier 305-*b* (e.g., a second frequency range) to service a second set of one or more UEs 115 (e.g., a second UE 115-*b*), respectively. To efficiently utilize system resources while serving UEs 115 located within a coverage area, the operators (e.g., associated with respective network entities 105) may share a single RU (e.g., corresponding to the network entity 105-*a*. That is, the operators may share an RU to efficiently serve respective UEs 115.

In some examples, each operator may be associated with one or more carriers at the RU (e.g., the operator 1 may own carrier 305-*a* and the operator 2 may own carrier 305-*b*). However, if the owning operator is not using the carrier (e.g., in the case of idle traffic on that carrier), then the carrier may be shared with other operators. For instance, the carrier unused by the owning operator may be used as a secondary cell (SCell) by another operator. Thus, the RU (e.g., the network entity 105-*a*) may transmit via multiple carriers (e.g., the carrier 305-*a* and the carrier 305-*b*). Each carrier may be associated with (e.g., owned by) one operator, but the owning operator may share the carrier when not in use.

Each operator may configure the served UEs 115 in a carrier aggregation mode (e.g., the first operator, via the shared RU, may configure the UE 115-*a* in carrier aggregation mode, and the second operator, via the shared RU, may configure the UE 115-*b* in carrier aggregation mode). During any given time interval (e.g., slot, symbol, etc.), an operator may use its own carrier 305 as a primary cell (PCell) of the configured CA. Each operator may also use an additional carrier 305 owned by another operator as an SCell of the carrier aggregation (e.g., to be used when the other operator is not using the additional carrier 305). The sharing may occur in a time division multiplexing (TDM) fashion (e.g., the owning operator may loan the whole carrier 305 or a portion of the carrier 305, to another operator for a certain time span or time interval).

For example, operator 1 may own carrier 305-*a* and operator 2 may own carrier 305-*b*. During a time interval in which both operators have traffic to communicate to served UEs 115 (e.g., time interval 0), operator 1 may use the carrier 305-*a* and operator 2 may use the carrier 305-*b*. During another time interval (e.g., time interval 1), the operator 1 may loan the carrier 305-*a* to operator 2. In such examples, during time interval 1, operator 2 may use carrier 305-*b* as a PCell 315-*a*, and may use the carrier 305-*a* as an SCell 310-*a*. Similarly, during another time interval (e.g., time interval 2), the operator 2 may loan the carrier 305-*b* to operator 1. Thus, during time interval 2, operator 1 may use the carrier 305-*a* as a PCell 315-*b*, and may use the carrier 305-*b* as an SCell 310-*b*.

Figure 4:
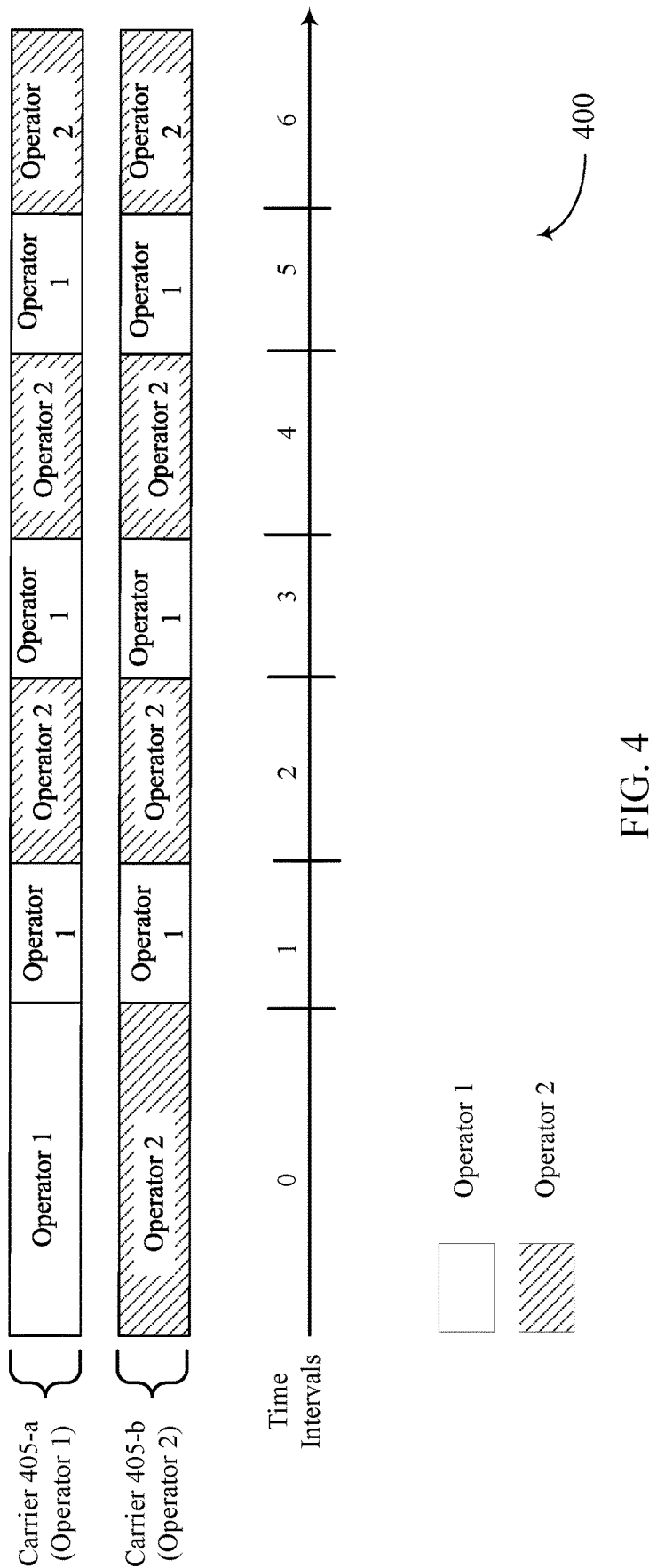
FIG. 4 illustrates an example of a timeline that supports carrier aggregation-based RU sharing in accordance with one or more aspects of the present disclosure.

FIG. 4 illustrates an example of a timeline 400 that supports carrier aggregation-based RU sharing in accordance with one or more aspects of the present disclosure. A first carrier 405-*a* may be associated with a first operator (e.g., operator 1) and a second carrier 405-*b* may be associated with a second operator (e.g., operator 2). The first carrier 405-*a* may operate similarly to the first carrier 305-*a*, the second carrier 405-*b* may operate similarly to the second carrier 305-*b*.

In some examples, the operators may coordinate with each other (e.g., to indicate when one operator is not using a carrier at a certain time). The operators may coordinate via the shared RU, or via a neutral entity (e.g., another network entity 105, or any other network node) which may act as a moderator for the coordinating operators. In some examples, the operators may communicate via backhaul signaling, such as CU to CU communication, RU to RU communication, DU to DU communication (e.g., as described in greater detail with reference to FIG. 2), or any combination thereof. In some examples, the operators may perform semi-static coordination.

In examples of semi-static coordination (e.g., semi-static configuration), the operators may perform carrier sharing and RU sharing according to a time domain pattern for the carriers 405 where the carriers 405 include the PCell and the SCells in a pattern corresponding to the time intervals. As an example, and as shown, the pattern may include alternating the operators for each time period 410 sequentially. Although the following discussions describe an operator-alternating pattern for the time intervals 1-6, the techniques described herein may apply to other patterns. Moreover, the pattern may include one or more patterns and/or begin at different points in the time interval. The time domain pattern may be pre-negotiated, where the pattern is negotiated between operators at least before the time period occurs.

Generally, the owning operator may have a higher priority for usage of the respective carrier. After negotiating the pattern (e.g., based on traffic patterns, historic traffic information, predicted traffic data, or other parameters) the operators may communicate according to the pattern. For instance, the first carrier 405-*a* may be used by the first operator, which is the owning operator, during the first time interval 0. Subsequently, the first carrier 405-*a* may be utilized according to an operator-alternating pattern of primary and SCells, so that the first operator uses the first carrier 405-*a* during time interval 1 (e.g., as a PCell), the second operator uses the first carrier 405-*a* during time interval 2 (as an SCell), and so forth. The second carrier 405-*b* may be utilized similarly with respect to the first and second operators (e.g., according to the pre-negotiated pattern).

Generally, the time domain pattern is pre-negotiated between operators and the time domain pattern is followed regardless of other carrier-related parameters, such as traffic associated with an operator for the particular carrier. As such, even if traffic on the first carrier 405-*a* increases for the first operator, the first operator may not utilize the first carrier 405-*a* during a time interval scheduled for the second operator. Moreover, since the time domain pattern is pre-negotiated in the semi-static coordination, the operators may communicate coordination signals relatively less than if the time domain pattern is negotiated in real time (e.g., reducing signaling overhead, decreasing overall system latency, and conserving power and resource expenditures). In additional or alternative coordination, the carrier sharing pattern may be dynamic.

Figure 5:
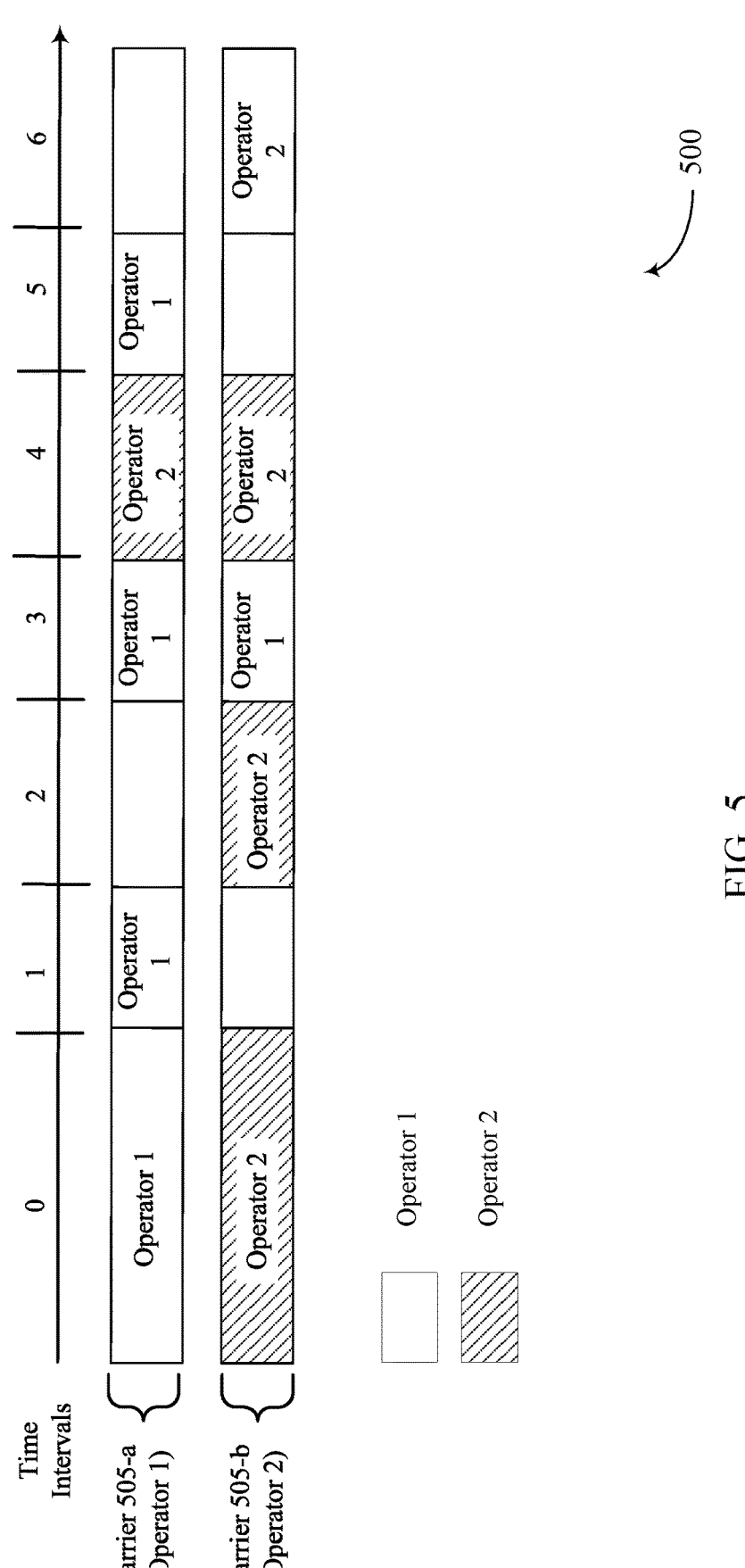
FIG. 5 illustrates an example of a timeline that supports carrier aggregation-based RU sharing in accordance with one or more aspects of the present disclosure.

FIG. 5 illustrates a timeline 500 that supports carrier aggregation-based RU sharing in accordance with one or more aspects of the present disclosure. A first carrier 505-*a* may be associated with a first operator (e.g., operator 1) and a second carrier 505-*b* may be associated with a second operator (e.g., operator 2). The first carrier 505-*a* may operate similarly to the first carrier 305-*a*, the second carrier 505-*b* may operate similarly to the second carrier 305-*b*, as discussed with respect to FIG. 3.

In some examples, the operators may perform a dynamic coordination based on which they may share their respective carriers 505. In examples of such dynamic coordination (e.g., dynamic configuration), the carrier aggregation-based RU sharing may include a time domain pattern for the carriers 505 where the carriers 505 may be used as the PCell or the SCell of a carrier aggregation in a pattern corresponding to various time intervals. The pattern may be dynamically negotiated based on coordination signals communicated between the operators (e.g., RU to RU communications, CU to CU communications, DU to DU communications, or any other backhaul signaling, or signaling via a relay node such as another neutral network entity 105), and thus, the pattern may be dynamic.

In the dynamic configuration, the owning operator may perform sharing or coordinating with the other operator (e.g., non-owning operator) on a dynamic basis (e.g., on a frame level, a slot level, or a symbol level). The dynamic coordination configuration may be used in additional to or as an alternative to the semi-static coordination discussed with respect to FIG. 4. Each operator may keep some time domain resources for itself. For example, operator 1 may maintain time interval 0, time interval 1, time interval 3, and time interval 5 (e.g., may not share these time intervals), and may use such time intervals for critical transmissions associated with operator 1. Similarly, operator 2 may maintain time interval 0, time interval 2, and time interval 4 for critical communications for operator 2 (e.g., may not share these time intervals). Each owning operator may also indicate some time domain resources that are dynamically shareable. Such resources may be under dynamic signaling control for sharing. For example, the first operator may indicate that it is willing to share time interval 2, time interval 4, and time interval 6, while operator 2 may indicate that it is willing to share time interval 1, time interval 3, and time interval 5. Each of these resources that are indicated as shareable may be claimed dynamically by another operator. Each of the time intervals may be, for example, one or more frames, one or more slots, or one or more symbols.

The dynamic allocation may be based on traffic patterns and the default sharing (e.g., priority) may be to serve the owning operator. For example, during time interval 1, the second operator may continue to use the second carrier 505-*b*, for example, if the traffic for the second operator is unexpectedly high. On the other hand, if the traffic is unexpectedly low, the operators may coordinate and the second operator may allow the first operator to use the second carrier 505-*b* during the second time period 510-*b*.

In the dynamic coordination, the coordination signaling between operators may indicate that a dynamic resource may be shared presently and/or in the future. The coordination signaling from the owning operator may be communicated to the other operator (e.g., non-owning operator) before the sharing time period (e.g., by at least a threshold amount of time) so that the other operator may prepare to use the resource (e.g., carrier 505) for UEs 115 served by the other operator. In some examples, the operators may default to a time domain pattern when the owning operator does not receive dynamic signaling and/or has not renegotiated the semi-static time domain pattern (e.g., by at least a threshold amount of time prior to a given time interval). The carriers 505 may be sharable or not shareable in the default time domain pattern based on a coordination configuration for the carriers 505. For instance, an operator may transmit an indication of dynamically available time intervals (e.g., the first operator may indicate that time interval 2 is available) at least a threshold time period prior to time interval 2 (e.g., so that the second operator has time to determine whether to select time interval 2 for using the carrier 505-*a*, and to indicate to the first operator that the second operator will use the available carrier 505-*a* during time interval 2). Similarly, if dynamic signaling is not received at least a threshold time period before a given time interval, the operators may apply a default behavior (e.g., in which case, dynamic signaling for that time interval will not be transmitted). The default behavior may be that the time interval is shared, or not shared (e.g., if dynamic signaling is not received a threshold amount of time before a time interval, then the time interval is considered shared or not shared, depending on the defined default behavior).

In some examples, when multiple operators use a shared RU as described herein, the dynamic signaling indicates which target operator to share to (e.g., the first operators indicates resources that it will share with the second operator, or requested resources to be shared with the first operator), or the coordinator selects the target operator to which to share available resources.

Figure 6:
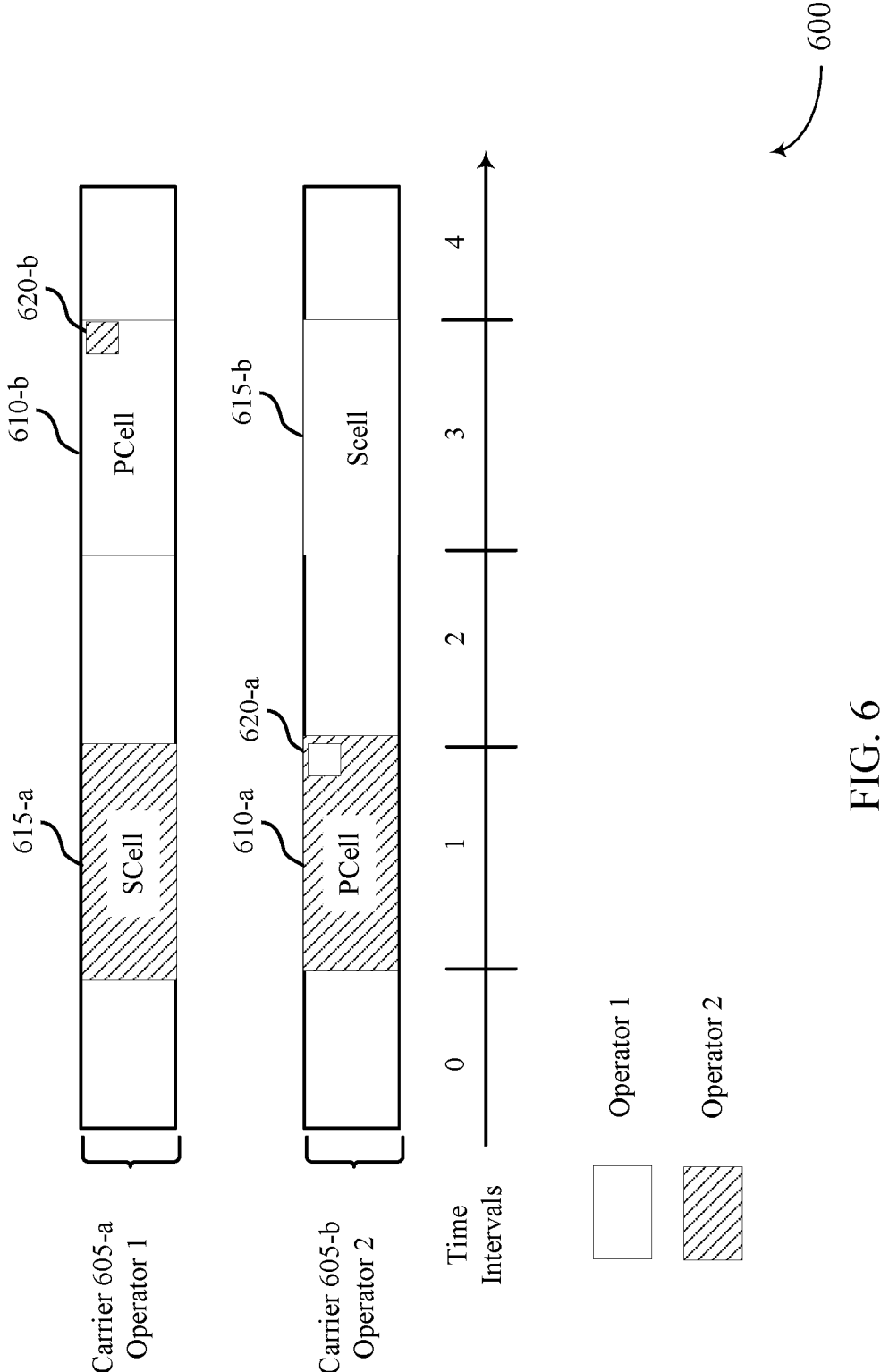
FIG. 6 illustrates an example of a timeline that supports the carrier aggregation-based RU sharing in accordance with one or more aspects of the present disclosure.

FIG. 6 illustrates an example of a timeline 600 that supports carrier aggregation-based RU sharing in accordance with one or more aspects of the present disclosure. A first carrier 605-*a* may be associated with a first operator (e.g., operator 1) and a second carrier 605-*b* may be associated with a second operator (e.g., operator 2). The first carrier 605-*a* may operate similarly to the first carrier 305-*a*, and the second carrier 605-*b* may operate similarly to the second carrier 305-*b*, as discussed with respect to FIG. 3.

In some examples, as described here, an operator may use an SCell of a carrier aggregation to transmit common signaling (e.g., synchronization signal blocks (SSBs), channel state information reference signals (CSI-RSs), system information, such as remaining minimum system information (RMSI), automatic neighbor relation (ANR) information, or any combination thereof). Common signaling may be periodic, however, periodic transmissions may be problematic on a carrier that an operator may only opportunistically use (e.g., may not be using during some periodic common signaling time intervals).

In some examples, as described in greater detail with reference to FIG. 7, an operator may share some common signaling with another operator (e.g., an owning operator of a loaned carrier 605). An owning operator may share one or more parameters for common signaling, and the non-owning operator using the loaned carrier 605 may tunnel the common signaling (e.g., transmit the common signaling according to one or more parameters). The UEs 115 served by the owning operator may receive the common signaling, perform one or more relevant measurements, etc. (e.g., based on the assumption that the received common signaling is from the owning operator). The served UEs may subsequently report measurements back to the owning operator.

In some examples, as illustrated with reference to FIG. 6, the owning operator may coordinate with other operators to determine dedicated resources within an owned carrier 605 (e.g., long term leased resources) for the owning operator. Such information may be indicated via semi-static coordination between the operators, such that some resources may always be shared such that the other operator can use the dedicated resources for common signaling transmissions. In such examples, the owning operator may give up control of some resources, even if there is (e.g., urgent) traffic pending, to allow periodic transmission on an SCell from the other operator. Operators may exchange such reservations with each other. Each operator may control its own transmissions (e.g., including transmissions dedicated to another operator). In some cases, a receiving UE may interpret SSBs as non cell-defining, and may skip searching a carrier. (e.g., may receive SSBs across multiple operators, while performing initial access). In some examples, the UE may continue to search the carrier, even if it detects another operators SSB, resulting in successful reception of common signaling even across shared carriers 605.

For example, during time interval 1, the first operator may loan carrier 605-*a* to the second operator, and the second operator may use the carrier 605-*b* as a PCell 610-*a* and carrier 605-*a* as an SCell 615-*a*. During other time intervals (e.g., during time interval 3), the first operator may utilize the carrier 605-*a* as a PCell 610-*a* and the carrier 605-*b* as an SCell 615-*b*. The first operator may identify a long-term lease on resources 620-*a*, such that it can periodically transmit common signaling (e.g., even during the time interval 1, during which the second operator is using the carrier 605-*b*). Similarly, the operators may coordinate to identify a long-term lease for resources 620-*b*, which may be dedicated for common signaling transmitted by the second operator (e.g., even during time interval 3, during which the first operator is using the carrier 605-*a* as a PCell 610-*b*).

Figure 7:
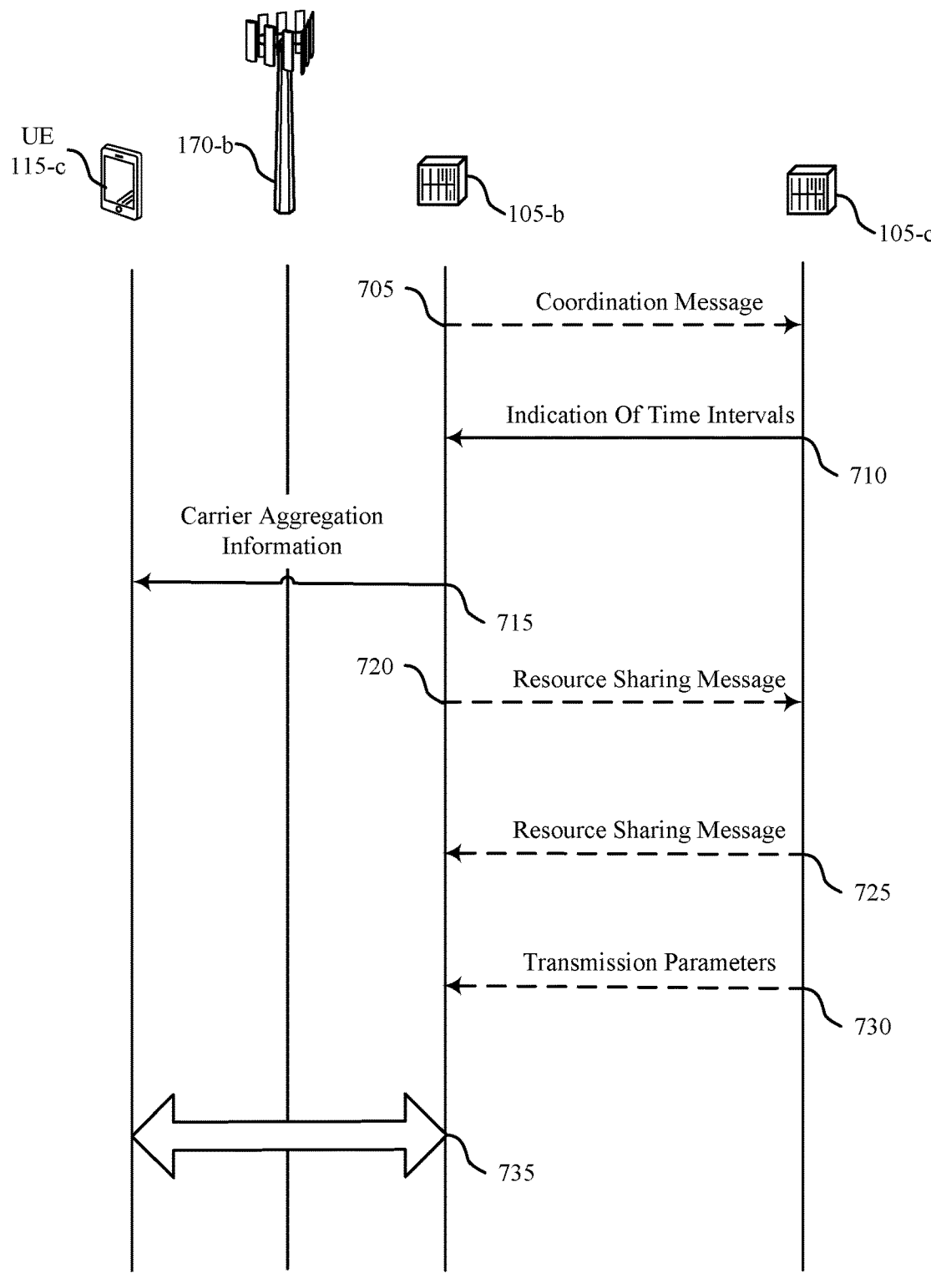
FIG. 7 illustrates an example of a process flow that supports carrier aggregation-based RU sharing in accordance with one or more aspects of the present disclosure.

FIG. 7 illustrates a process flow 700 that supports carrier aggregation-based RU sharing in accordance with one or more aspects of the present disclosure. The process flow 700 may include a UE 115-*c*, a network entity 105-*b*, and a network entity 105-*c*, which may be examples of a UE 115 and a network entity 105, such as the first UE 115-*a* and the first network entity 105-*a*, as described herein. The first network entity 105-*b* may be associated with a first operator, and the second network entity 105-*c* may be associated with a second operator. The first network entity 105-*b* may serve one or more UEs (e.g., including the UE 115-*c*). The first network entity 105-*b* and the second network entity 105-*c* may communicate via a shared RU 170-*b*. In the following description of the process flow 700 between the UE 115-*c* and the network entity 105-*b*, the operations may be transmitted in a different order than the example order shown, or the operations performed by the UE 115-*c*) and the network entity 105-*b* may be performed in different orders or at different times. Moreover, although the following discussions describe a UE 115 and a network entity 105 (e.g., communicating via an RU 170-*b* shared by multiple network entities 105 associated with multiple operators), the techniques described herein may be additionally or alternatively performed between UEs 115, or any other wireless node. Additionally, some operations may also be omitted from the process flow 700, and other operations may be added to the process flow 700.

As described herein, the UEs 115 may coordinate carrier sharing in a time domain pattern that is semi-static or dynamic. At 710, the first network entity 105-*b* associated with a first carrier (e.g., owning the first carrier) may receive, from the second network entity 105-*c* associated with a second carrier (e.g., owning the second carrier) an indication of a first set of time intervals during which the second carrier is available for wireless communications performed by the first network entity 105-*b*. The first network entity 105-*b* may receive the indication at 710 via a CU of the first network entity 105-*b*, or a DU of the first network entity 105-*b*, from a CU of the second network entity 105-*c*, or a DU of the second network entity 105-*c*, or via a third (e.g., moderator) node.

In some examples, the indication of the set of time intervals may include a semi-static configuration (e.g., as described in greater detail with reference to FIG. 4). For instance, the indication may include an indication of a configuration of the first set of time intervals and a second set of time intervals during which the second carrier is unavailable for wireless communications performed by the first network entity 105-*b* and is occupied by wireless communications performed by the second network entity 105-*c* via the RU 170-*b*. In some cases, the configuration may further indicate that the first carrier is available for wireless communications performed by the second network entity via the RU 170-*b* during one or more time intervals of the second set of time intervals.

In some cases, the network entities 105 may coordinate the semi-static configuration. For instance, at 705, the first network entity 105-*b* may transmit a coordination message indicating an availability of the first carrier for the wireless communications performed by the second network entity 105-*c* via the RU 170-*b* during the second set of time intervals, wherein receiving the indication of the configuration at 710 is based at least in part on the coordination message transmitted at 705. Similarly, although not shown, the second network entity 105-*c* may transmit a coordination message, to which the first network entity 105-*b* may respond with an indication of time intervals.

In some examples, the indication received at 710 may include dynamic coordination information (e.g., as described in greater detail with reference to FIG. 5). For instance, the indication may include an indication of the first set of time intervals, a second set of time intervals during which the second carrier is unavailable for wireless communications performed by the first network entity 105-*b* and is occupied by wireless communications performed by the second network entity 105-*c* via the RU 170-*b*, and a shared third set of time intervals during which the second carrier is available for wireless communications performed by the first network entity 105-*b* or the second network entity 105-*c*. In some examples, such dynamic coordination may be established in addition to semi-static coordination.

In such examples, at 720, the first network entity 105-*b* may transmit, to the second network entity 105-*c* at least a threshold amount of time prior to a first time interval of the shared third set of time intervals, a resource sharing message indicating the first time interval of the shared third set of time intervals. In such examples, at 735, the first network entity 105-*b* may communicate, via the first and second carriers, during the first time interval of the shared third set of time intervals.

In some such examples, at 725, the first network entity 105-*b* may receive, from the second network entity 105-*c* at least a threshold amount of time prior to a first time interval of the shared third set of time intervals, a resource sharing message indicating the first time interval of the shared third set of time intervals. In such examples, the first network entity 105-*b* may refrain from communicating via the first and second carriers during the first time interval of the shared third set of time intervals.

At 730, the first network entity 105-*b* may receive, from the second network entity 105-*c*, an indication of transmission parameters for common signaling associated with the first operator and the second operator. At 735, the first network entity 105-*b* may transmit common signaling according to the transmission parameters. In some examples, the first network entity 105-*b* may receive, from the second network entity 105-*c*, an indication of first subset of frequency resources of the first carrier reserved for transmitting common signaling associated with the second operator, and may refrain from communicating with one or more UEs 115 via the first subset of frequency resources. Similarly, the first network entity 105-*b* may transmit, to the second network entity 105-*c*, an indication of a second subset of frequency resources of the second carrier reserved for common signaling associated with the first operator, and may transmit common signaling via the second subset of frequency resources of the first carrier during a second set of time intervals during which the second carrier is otherwise unavailable for wireless communications performed by the first network entity 105-*b*.

At 715, the first network entity 105-*c* may transmit (e.g., via RU 170-*b*) control signaling indicating a carrier aggregation mode associated with the first carrier and the second carrier to one or more UEs 115 (e.g., the UE 115-*c*).

At 735, the first network entity 105-*c* may communicate, via the single shared RU 170-*b*, with the UE 115-*c* during the first set of time intervals via the first and second carrier according to the indication of the carrier aggregation mode.

Figure 8:
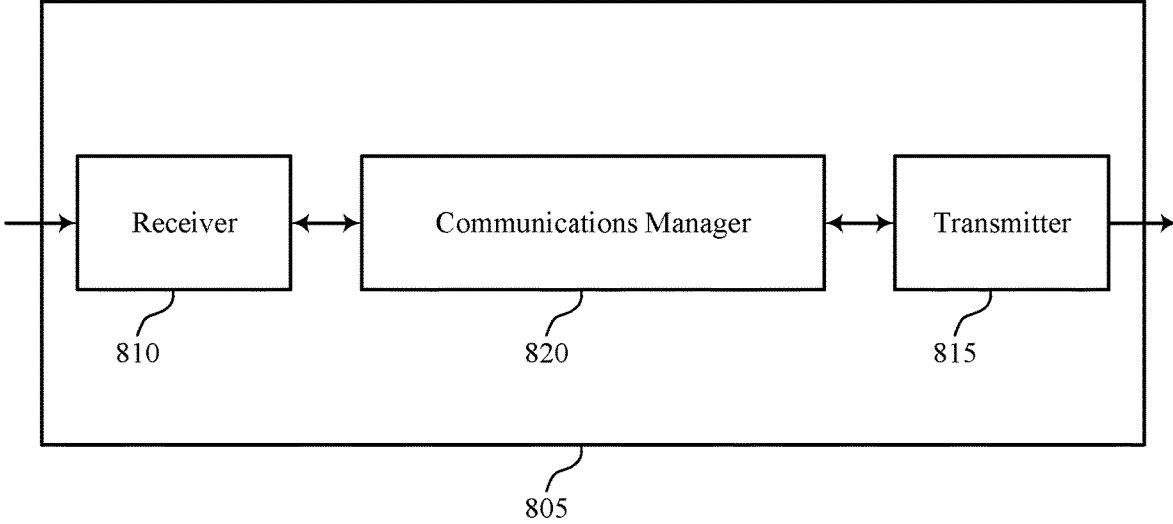
FIGS. 8 and 9 show block diagrams of devices that support physical layer designs for carrier aggregation-based RU sharing in accordance with one or more aspects of the present disclosure.

FIG. 8 shows a block diagram 800 of a device 805 that supports physical layer designs for carrier aggregation-based RU sharing in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of physical layer designs for carrier aggregation-based RU sharing as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The communications manager 820 may be configured as or otherwise support a means for transmitting, based on receiving the indication, control signaling indicating a carrier aggregation mode associated with the first carrier and the second carrier for one or more user equipments (UE). The communications manager 820 may be configured as or otherwise support a means for communicating, via the RU, with the one or more UEs during the first set of time intervals via the first carrier and the second carrier according to the indication of the carrier aggregation mode.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for carrier-aggregation based coordination and sharing.

Figure 9:
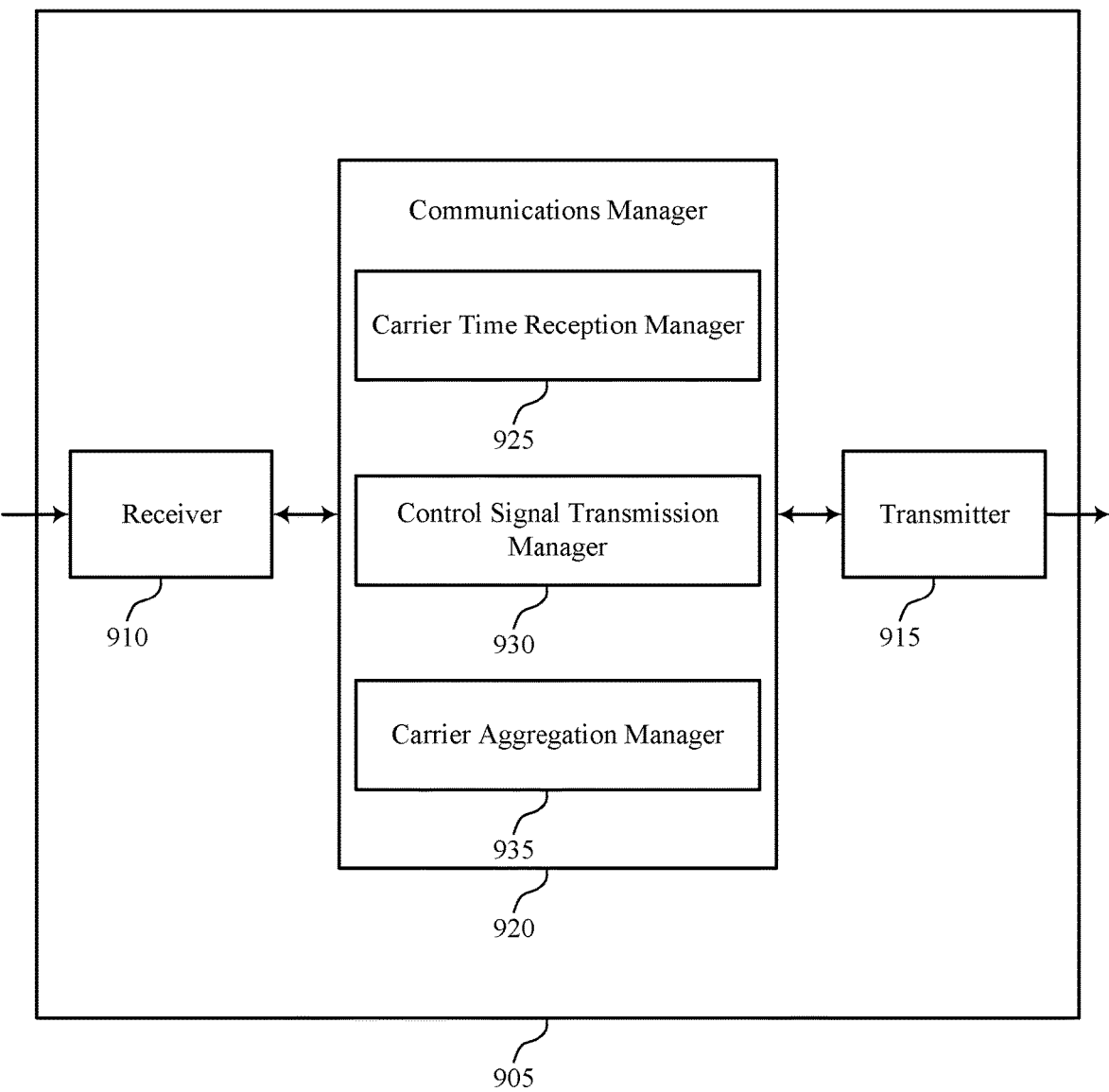

FIG. 9 shows a block diagram 900 of a device 905 that supports physical layer designs for carrier aggregation-based RU sharing in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of physical layer designs for carrier aggregation-based RU sharing as described herein. For example, the communications manager 920 may include a carrier time reception manager 925, a control signal transmission manager 930, a carrier aggregation manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The carrier time reception manager 925 may be configured as or otherwise support a means for receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The control signal transmission manager 930 may be configured as or otherwise support a means for transmitting, based on receiving the indication, control signaling indicating a carrier aggregation mode associated with the first carrier and the second carrier for one or more user equipments (UE). The carrier aggregation manager 935 may be configured as or otherwise support a means for communicating, via the RU, with the one or more UEs during the first set of time intervals via the first carrier and the second carrier according to the indication of the carrier aggregation mode.

Figure 10:
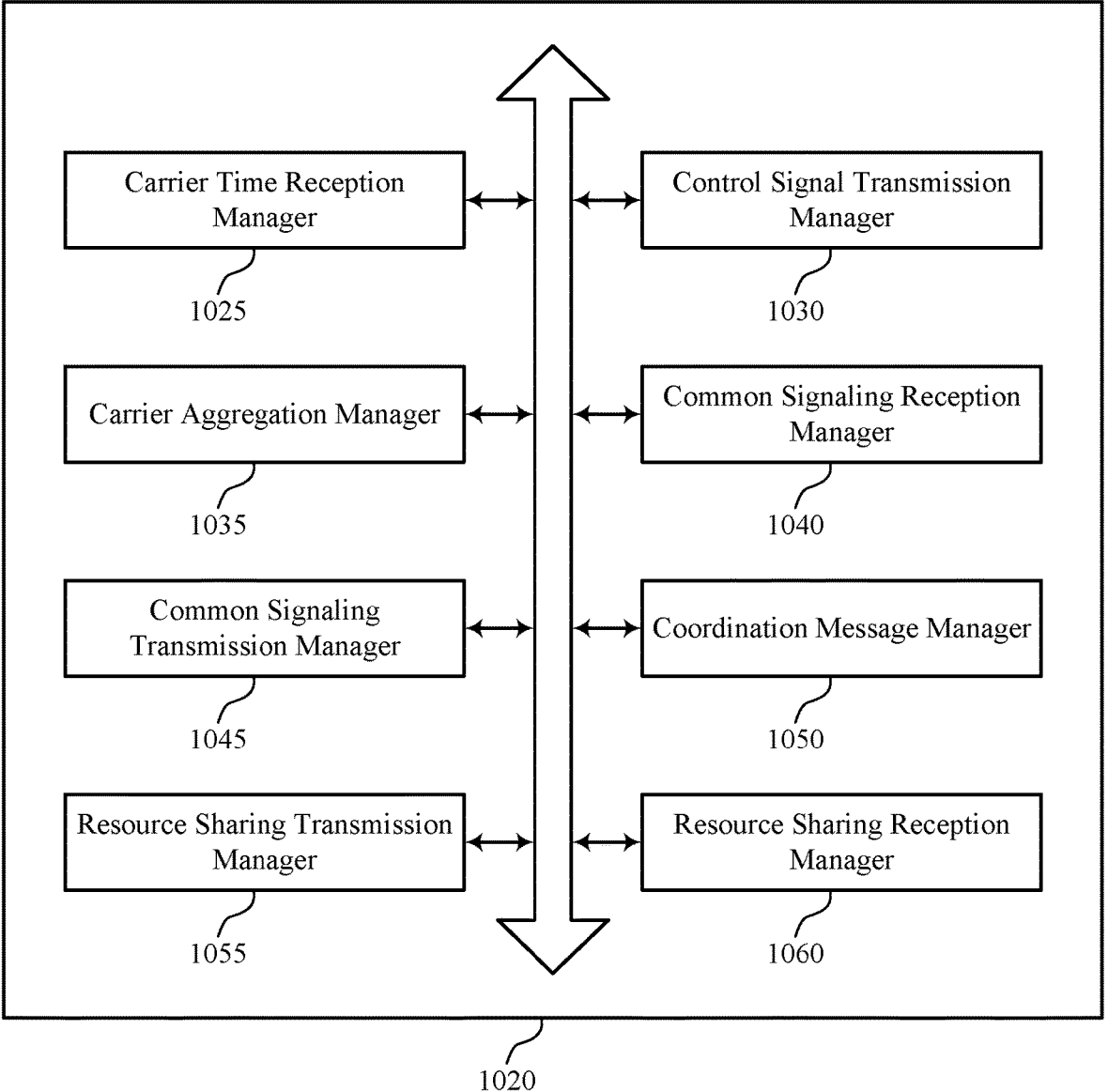
FIG. 10 shows a block diagram of a communications manager that supports physical layer designs for carrier aggregation-based RU sharing in accordance with one or more aspects of the present disclosure.

FIG. 10 shows a block diagram 1000 of a communications manager 1020 that supports physical layer designs for carrier aggregation-based RU sharing in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of physical layer designs for carrier aggregation-based RU sharing as described herein. For example, the communications manager 1020 may include a carrier time reception manager 1025, a control signal transmission manager 1030, a carrier aggregation manager 1035, a common signaling reception manager 1040, a common signaling transmission manager 1045, a coordination message manager 1050, a resource sharing transmission manager 1055, a resource sharing reception manager 1060, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The carrier time reception manager 1025 may be configured as or otherwise support a means for receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The control signal transmission manager 1030 may be configured as or otherwise support a means for transmitting, based on receiving the indication, control signaling indicating a carrier aggregation mode associated with the first carrier and the second carrier for one or more user equipments (UE). The carrier aggregation manager 1035 may be configured as or otherwise support a means for communicating, via the RU, with the one or more UEs during the first set of time intervals via the first carrier and the second carrier according to the indication of the carrier aggregation mode.

In some examples, to support receiving the indication, carrier time reception manager 1025 may be configured as or otherwise support a means for receiving an indication of a configuration of the first set of time intervals and a second set of time intervals during which the second carrier is unavailable for wireless communications performed by the first network entity and is occupied by wireless communications performed by the second network entity via the RU.

In some examples, the configuration further indicates that the first carrier is available for wireless communications performed by the second network entity via the RU during one or more time intervals of the second set of time intervals.

In some examples, the coordination message manager 1050 may be configured as or otherwise support a means for transmitting a coordination message indicating an availability of the first carrier for the wireless communications performed by the second network entity via the RU during the second set of time intervals, where receiving the indication of the configuration is based on the coordination message.

In some examples, to support receiving the indication, the carrier time reception manager 1025 may be configured as or otherwise support a means for receiving an indication of the first set of time intervals, a second set of time intervals during which the second carrier is unavailable for wireless communications performed by the first network entity and is occupied by wireless communications performed by the second network entity via the RU, and a shared third set of time intervals during which the second carrier is available for wireless communications performed by the first network entity or the second network entity.

In some examples, the resource sharing transmission manager 1055 may be configured as or otherwise support a means for transmitting, to the second network entity at least a threshold amount of time prior to a first time interval of the shared third set of time intervals, a resource sharing message indicating the first time interval of the shared third set of time intervals. In some examples, the carrier aggregation manager 1035 may be configured as or otherwise support a means for communicating, via the first carrier and the second carrier and based on the resource sharing message, with the one or more UEs during the first time interval of the shared third set of time intervals.

In some examples, the resource sharing reception manager 1060 may be configured as or otherwise support a means for receiving, from the second network entity at least a threshold amount of time prior to a first time interval of the shared third set of time intervals, a resource sharing message indicating the first time interval of the shared third set of time intervals. In some examples, the carrier time reception manager 1025 may be configured as or otherwise support a means for refraining from communicating with the one or more UEs via the first carrier and the second carrier during the first time interval of the shared third set of time intervals based on receiving the resource sharing message.

In some examples, the common signaling reception manager 1040 may be configured as or otherwise support a means for receiving, from the second network entity, an indication of transmission parameters for common signaling associated with the first operator and the second operator. In some examples, the common signaling transmission manager 1045 may be configured as or otherwise support a means for transmitting, during the first set of time intervals, the common signaling according to the transmission parameters.

In some examples, the common signaling includes synchronization signals, channel state information reference signals, or a combination thereof.

In some examples, the common signaling reception manager 1040 may be configured as or otherwise support a means for receiving, from the second network entity, an indication of first subset of frequency resources of the first carrier reserved for transmitting common signaling associated with the second operator. In some examples, the carrier time reception manager 1025 may be configured as or otherwise support a means for refraining from communicating with the one or more UEs via the first subset of frequency resources during the first set of time intervals.

In some examples, the common signaling transmission manager 1045 may be configured as or otherwise support a means for transmitting, to the second network entity, an indication of a second subset of frequency resources of the second carrier reserved for common signaling associated with the first operator. In some examples, the common signaling transmission manager 1045 may be configured as or otherwise support a means for transmitting the common signaling via the second subset of frequency resources of the first carrier during a second set of time intervals during which the second carrier is otherwise unavailable for wireless communications performed by the first network entity.

In some examples, the common signaling includes synchronization signals, channel state information reference signals, system information, automatic neighbor relation information, or any combination thereof.

In some examples, to support receiving the indication, the carrier time reception manager 1025 may be configured as or otherwise support a means for receiving the indication via a CU of the first network entity or a DU of the first network entity from a CU of the second network entity or a DU of the second network entity.

In some examples, to support receiving the indication, the carrier time reception manager 1025 may be configured as or otherwise support a means for receiving the indication via a third network entity relaying the indication from the second network entity.

In some examples, to support communicating with the one or more UEs, the control signal transmission manager 1030 may be configured as or otherwise support a means for transmitting control signaling via the first carrier, the first carrier including a PCell of the carrier aggregation mode. In some examples, to support communicating with the one or more UEs, the common signaling transmission manager 1045 may be configured as or otherwise support a means for transmitting data signaling, common signaling, or both, via the second carrier, the second carrier including a SCell of the carrier aggregation mode.

Figure 11:
FIG. 11 shows a diagram of a system including a device that supports physical layer designs for carrier aggregation-based RU sharing in accordance with one or more aspects of the present disclosure.

FIG. 11 shows a diagram of a system 1100 including a device 1105 that supports physical layer designs for carrier aggregation-based RU sharing in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting physical layer designs for carrier aggregation-based RU sharing). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

For example, the communications manager 1120 may be configured as or otherwise support a means for receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The communications manager 1120 may be configured as or otherwise support a means for transmitting, based on receiving the indication, control signaling indicating a carrier aggregation mode associated with the first carrier and the second carrier for one or more user equipments (UE). The communications manager 1120 may be configured as or otherwise support a means for communicating, via the RU, with the one or more UEs during the first set of time intervals via the first carrier and the second carrier according to the indication of the carrier aggregation mode.

By including or configuring the communications manager 1120 in accordance with examples as described herein, the device 1105 may support techniques for carrier-aggregation based coordination and sharing to facilitate more efficient utilization of communication resources (e.g., carriers).

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of physical layer designs for carrier aggregation-based RU sharing as described herein, or the processor 1135 and the memory 1125 may be otherwise configured to perform or support such operations.

FIG. 12 shows a flowchart illustrating a method 1200 that supports physical layer designs for carrier aggregation-based RU sharing in accordance with one or more aspects of the present disclosure. The operations of the method 1200 may be implemented by a network entity or its components as described herein. For example, the operations of the method 1200 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1205, the method may include receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The operations of 1205 may be performed in accordance with examples as disclosed herein. In some examples, aspects of the operations of 1205 may be performed by a carrier time reception manager 1025 as described with reference to FIG. 10.

At 1210, the method may include transmitting, based on receiving the indication, control signaling indicating a carrier aggregation mode associated with the first carrier and the second carrier for one or more user equipments (UE). The operations of 1210 may be performed in accordance with examples as disclosed herein. In some examples, aspects of the operations of 1210 may be performed by a control signal transmission manager 1030 as described with reference to FIG. 10.

At 1215, the method may include communicating, via the RU, with the one or more UEs during the first set of time intervals via the first carrier and the second carrier according to the indication of the carrier aggregation mode. The operations of 1215 may be performed in accordance with examples as disclosed herein. In some examples, aspects of the operations of 1215 may be performed by a carrier aggregation manager 1035 as described with reference to FIG. 10.

FIG. 13 shows a flowchart illustrating a method 1300 that supports physical layer designs for carrier aggregation-based RU sharing in accordance with one or more aspects of the present disclosure. The operations of the method 1300 may be implemented by a network entity or its components as described herein. For example, the operations of the method 1300 may be performed by a network entity as described with reference to FIGS. 1 through 11. In some examples, a network entity may execute a set of instructions to control the functional elements of the network entity to perform the described functions. Additionally, or alternatively, the network entity may perform aspects of the described functions using special-purpose hardware.

At 1305, the method may include receiving, by a first network entity associated with a first carrier from a second network entity associated with a second carrier, an indication of a first set of time intervals during which the second carrier is available for wireless communications performed by the first network entity, where the first network entity is associated with a first operator and the second network entity is associated with a second operator, and where both the first network entity and the second network entity are coupled to a single RU. The operations of 1305 may be performed in accordance with examples as disclosed herein. In some examples, aspects of the operations of 1305 may be performed by a carrier time reception manager 1025 as described with reference to FIG. 10.

At 1310, the method may include transmitting, based on receiving the indication, control signaling indicating a carrier aggregation mode associated with the first carrier and the second carrier for one or more user equipments (UE). The operations of 1310 may be performed in accordance with examples as disclosed herein. In some examples, aspects of the operations of 1310 may be performed by a control signal transmission manager 1030 as described with reference to FIG. 10.

At 1315, the method may include communicating, via the RU, with the one or more UEs during the first set of time intervals via the first carrier and the second carrier according to the indication of the carrier aggregation mode. The operations of 1315 may be performed in accordance with examples as disclosed herein. In some examples, aspects of the operations of 1315 may be performed by a carrier aggregation manager 1035 as described with reference to FIG. 10.

At 1320, the method may include receiving an indication of a configuration of the first set of time intervals and a second set of time intervals during which the second carrier is unavailable for wireless communications performed by the first network entity and is occupied by wireless communications performed by the second network entity via the RU. The operations of 1320 may be performed in accordance with examples as disclosed herein. In some examples, aspects of the operations of 1320 may be performed by a carrier time reception manager 1025 as described with reference to FIG. 10.

The following provides an overview of aspects of the present disclosure:

Aspect 1: A method for wireless communications comprising: receiving, by a first network entity associated with a first carrier from a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit; transmitting, based at least in part on receiving the indication, control signaling indicating a carrier aggregation mode associated with the first carrier and the second carrier for one or more user equipments (UE); and communicating, via the radio unit, with the one or more UEs during the first set of time intervals via the first carrier and the second carrier according to the indication of the carrier aggregation mode.

Aspect 2: The method of aspect 1, wherein receiving the indication comprises: receiving an indication of a configuration of the first set of time intervals and a second set of time intervals during which the second carrier is unavailable for wireless communications performed by the first network entity and is occupied by wireless communications performed by the second network entity via the radio unit.

Aspect 3: The method of aspect 2, wherein the configuration further indicates that the first carrier is available for wireless communications performed by the second network entity via the radio unit during one or more time intervals of the second set of time intervals.

Aspect 4: The method of any of aspects 2 through 3, further comprising: transmitting a coordination message indicating an availability of the first carrier for the wireless communications performed by the second network entity via the radio unit during the second set of time intervals, wherein receiving the indication of the configuration is based at least in part on the coordination message.

Aspect 5: The method of any of aspects 1 through 4, wherein receiving the indication comprises: receiving an indication of the first set of time intervals, a second set of time intervals during which the second carrier is unavailable for wireless communications performed by the first network entity and is occupied by wireless communications performed by the second network entity via the radio unit, and a shared third set of time intervals during which the second carrier is available for wireless communications performed by the first network entity or the second network entity.

Aspect 6: The method of aspect 5, further comprising: transmitting, to the second network entity at least a threshold amount of time prior to a first time interval of the shared third set of time intervals, a resource sharing message indicating the first time interval of the shared third set of time intervals; and communicating, via the first carrier and the second carrier and based at least in part on the resource sharing message, with the one or more UEs during the first time interval of the shared third set of time intervals.

Aspect 7: The method of any of aspects 5 through 6, further comprising: receiving, from the second network entity at least a threshold amount of time prior to a first time interval of the shared third set of time intervals, a resource sharing message indicating the first time interval of the shared third set of time intervals; and refraining from communicating with the one or more UEs via the first carrier and the second carrier during the first time interval of the shared third set of time intervals based at least in part on receiving the resource sharing message.

Aspect 8: The method of any of aspects 1 through 7, further comprising: receiving, from the second network entity, an indication of transmission parameters for common signaling associated with the first operator and the second operator; and transmitting, during the first set of time intervals, the common signaling according to the transmission parameters.

Aspect 9: The method of aspect 8, wherein the common signaling comprises synchronization signals, channel state information reference signals, or a combination thereof.

Aspect 10: The method of any of aspects 1 through 9, further comprising: receiving, from the second network entity, an indication of first subset of frequency resources of the first carrier reserved for transmitting common signaling associated with the second operator; and refraining from communicating with the one or more UEs via the first subset of frequency resources during the first set of time intervals.

Aspect 11: The method of aspect 10, further comprising: transmitting, to the second network entity, an indication of a second subset of frequency resources of the second carrier reserved for common signaling associated with the first operator; and transmitting the common signaling via the second subset of frequency resources of the first carrier during a second set of time intervals during which the second carrier is otherwise unavailable for wireless communications performed by the first network entity.

Aspect 12: The method of any of aspects 10 through 11, wherein the common signaling comprises synchronization signals, channel state information reference signals, system information, automatic neighbor relation information, or any combination thereof.

Aspect 13: The method of any of aspects 1 through 12, wherein receiving the indication comprises: receiving the indication via a CU of the first network entity or a DU of the first network entity from a CU of the second network entity or a DU of the second network entity.

Aspect 14: The method of any of aspects 1 through 13, wherein receiving the indication comprises: receiving the indication via a third network entity relaying the indication from the second network entity.

Aspect 15: The method of any of aspects 1 through 14, wherein communicating with the one or more UEs comprises: transmitting control signaling via the first carrier, the first carrier comprising a primary cell of the carrier aggregation mode; and transmitting data signaling, common signaling, or both, via the second carrier, the second carrier comprising a secondary cell of the carrier aggregation mode.

Aspect 16: An apparatus comprising a processor; memory coupled with the processor; and instructions stored in the memory and executable by the processor to cause the apparatus to perform a method of any of aspects 1 through 15.

Aspect 17: An apparatus comprising at least one means for performing a method of any of aspects 1 through 15.

Aspect 18: A non-transitory computer-readable medium storing code the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   at least one processor;
   memory coupled with the at least one processor; and
   instructions stored in the memory and executable by the at least one processor to cause the apparatus to:
   receive, via a central unit or a distributed unit of a first network entity associated with a first carrier from a central unit or a distributed unit of a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit;
   transmit, based at least in part on receiving the indication, control signaling indicating a carrier aggregation mode associated with the first carrier and the second carrier for one or more user equipments (UE); and
   communicate, via the radio unit, with the one or more UEs during the first set of time intervals via the first carrier and the second carrier according to the indication of the carrier aggregation mode.

2. The apparatus of claim 1, wherein the instructions to receive the indication are executable by the at least one processor to cause the apparatus to:
   receive an indication of a configuration of the first set of time intervals and a second set of time intervals during which the second carrier is unavailable for wireless communications performed by the first network entity and is occupied by wireless communications performed by the second network entity via the radio unit.

3. The apparatus of claim 2, wherein the configuration further indicates that the first carrier is available for wireless communications performed by the second network entity via the radio unit during one or more time intervals of the second set of time intervals.

4. The apparatus of claim 2, wherein the instructions are further executable by the at least one processor to cause the apparatus to:
   transmit a coordination message indicating an availability of the first carrier for the wireless communications performed by the second network entity via the radio unit during the second set of time intervals, wherein receiving the indication of the configuration is based at least in part on the coordination message.

5. The apparatus of claim 1, wherein the instructions to receive the indication are executable by the at least one processor to cause the apparatus to:

receive an indication of the first set of time intervals, a second set of time intervals during which the second carrier is unavailable for wireless communications performed by the first network entity and is occupied by wireless communications performed by the second network entity via the radio unit, and a shared third set of time intervals during which the second carrier is available for wireless communications performed by the first network entity or the second network entity.

6. The apparatus of claim 5, wherein the instructions are further executable by the at least one processor to cause the apparatus to:

transmit, to the second network entity at least a threshold amount of time prior to a first time interval of the shared third set of time intervals, a resource sharing message indicating the first time interval of the shared third set of time intervals; and communicate, via the first carrier and the second carrier and based at least in part on the resource sharing message, with the one or more UEs during the first time interval of the shared third set of time intervals.

7. The apparatus of claim 5, wherein the instructions are further executable by the at least one processor to cause the apparatus to:

receive, from the second network entity at least a threshold amount of time prior to a first time interval of the shared third set of time intervals, a resource sharing message indicating the first time interval of the shared third set of time intervals; and refrain from communicating with the one or more UEs via the first carrier and the second carrier during the first time interval of the shared third set of time intervals based at least in part on receiving the resource sharing message.

8. The apparatus of claim 1, wherein the instructions are further executable by the at least one processor to cause the apparatus to:

receive, from the second network entity, an indication of transmission parameters for common signaling associated with the first operator and the second operator; and transmit, during the first set of time intervals, the common signaling according to the transmission parameters.

9. The apparatus of claim 8, wherein:

the common signaling comprises synchronization signals, channel state information reference signals, or a combination thereof.

10. The apparatus of claim 1, wherein the instructions are further executable by the at least one processor to cause the apparatus to:

receive, from the second network entity, an indication of first subset of frequency resources of the first carrier reserved for transmitting common signaling associated with the second operator; and refrain from communicating with the one or more UEs via the first subset of frequency resources during the first set of time intervals.

11. The apparatus of claim 10, wherein the instructions are further executable by the at least one processor to cause the apparatus to:

transmit, to the second network entity, an indication of a second subset of frequency resources of the second carrier reserved for common signaling associated with the first operator; and transmit the common signaling via the second subset of frequency resources of the first carrier during a second set of time intervals during which the second carrier is otherwise unavailable for wireless communications performed by the first network entity.

12. The apparatus of claim 10, wherein:

the common signaling comprises synchronization signals, channel state information reference signals, system information, automatic neighbor relation information, or any combination thereof.

13. The apparatus of claim 1, wherein the instructions to receive the indication are executable by the at least one processor to cause the apparatus to:

receive the indication via a third network entity relaying the indication from the second network entity.

14. The apparatus of claim 1, wherein the instructions to communicate with the one or more UEs are executable by the at least one processor to cause the apparatus to:

transmit control signaling via the first carrier, the first carrier comprising a primary cell of the carrier aggregation mode; and transmit data signaling, common signaling, or both, via the second carrier, the second carrier comprising a secondary cell of the carrier aggregation mode.

15. A method for wireless communications comprising:

receiving, via a central unit or a distributed unit of a first network entity associated with a first carrier from a central unit or a distributed unit of a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit;

transmitting, based at least in part on receiving the indication, control signaling indicating a carrier aggregation mode associated with the first carrier and the second carrier for one or more user equipments (UE); and communicating, via the radio unit, with the one or more UEs during the first set of time intervals via the first carrier and the second carrier according to the indication of the carrier aggregation mode.

16. The method of claim 15, wherein receiving the indication comprises:

receiving an indication of a configuration of the first set of time intervals and a second set of time intervals during which the second carrier is unavailable for wireless communications performed by the first network entity and is occupied by wireless communications performed by the second network entity via the radio unit.

17. The method of claim 16, wherein the configuration further indicates that the first carrier is available for wireless communications performed by the second network entity via the radio unit during one or more time intervals of the second set of time intervals.

18. The method of claim 16, further comprising:

transmitting a coordination message indicating an availability of the first carrier for the wireless communications performed by the second network entity via the radio unit during the second set of time intervals, wherein receiving the indication of the configuration is based at least in part on the coordination message.

19. The method of claim 15, wherein receiving the indication comprises:

receiving an indication of the first set of time intervals, a second set of time intervals during which the second carrier is unavailable for wireless communications performed by the first network entity and is occupied by wireless communications performed by the second network entity via the radio unit, and a shared third set of time intervals during which the second carrier is available for wireless communications performed by the first network entity or the second network entity.

20. The method of claim 19, further comprising:

transmitting, to the second network entity at least a threshold amount of time prior to a first time interval of the shared third set of time intervals, a resource sharing message indicating the first time interval of the shared third set of time intervals; and communicating, via the first carrier and the second carrier and based at least in part on the resource sharing message, with the one or more UEs during the first time interval of the shared third set of time intervals.

21. The method of claim 19, further comprising:

receiving, from the second network entity at least a threshold amount of time prior to a first time interval of the shared third set of time intervals, a resource sharing message indicating the first time interval of the shared third set of time intervals; and refraining from communicating with the one or more UEs via the first carrier and the second carrier during the first time interval of the shared third set of time intervals based at least in part on receiving the resource sharing message.

22. The method of claim 15, further comprising:

receiving, from the second network entity, an indication of transmission parameters for common signaling associated with the first operator and the second operator; and transmitting, during the first set of time intervals, the common signaling according to the transmission parameters.

23. The method of claim 22, wherein the common signaling comprises synchronization signals, channel state information reference signals, or a combination thereof.

24. The method of claim 15, further comprising:

receiving, from the second network entity, an indication of first subset of frequency resources of the first carrier reserved for transmitting common signaling associated with the second operator; and refraining from communicating with the one or more UEs via the first subset of frequency resources during the first set of time intervals.

25. The method of claim 24, further comprising:

transmitting, to the second network entity, an indication of a second subset of frequency resources of the second carrier reserved for common signaling associated with the first operator; and transmitting the common signaling via the second subset of frequency resources of the first carrier during a second set of time intervals during which the second carrier is otherwise unavailable for wireless communications performed by the first network entity.

26. The method of claim 24, wherein the common signaling comprises synchronization signals, channel state information reference signals, system information, automatic neighbor relation information, or any combination thereof.

27. An apparatus, comprising:

means for receiving, via a central unit or a distributed unit of a first network entity associated with a first carrier from a central unit or a distributed unit of a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit;

means for transmitting, based at least in part on receiving the indication, control signaling indicating a carrier aggregation mode associated with the first carrier and the second carrier for one or more user equipments (UE); and means for communicating, via the radio unit, with the one or more UEs during the first set of time intervals via the first carrier and the second carrier according to the indication of the carrier aggregation mode.

28. A non-transitory computer-readable medium storing code, the code comprising instructions executable by at least one processor to:

receive, via a central unit or a distributed unit of a first network entity associated with a first carrier from a central unit or a distributed unit of a second network entity associated with a second carrier, an indication of a first set of time intervals during which the second carrier is available for wireless communications performed by the first network entity, wherein the first network entity is associated with a first operator and the second network entity is associated with a second operator, and wherein both the first network entity and the second network entity are coupled to a single radio unit;

transmit, based at least in part on receiving the indication, control signaling indicating a carrier aggregation mode associated with the first carrier and the second carrier for one or more user equipments (UE); and communicate, via the radio unit, with the one or more UEs during the first set of time intervals via the first carrier and the second carrier according to the indication of the carrier aggregation mode.

* * * * *